Aug. 6, 1968        W. RUF        3,395,672

AMPHIBIOUS MOTOR VEHICLE

Filed April 20, 1967        5 Sheets-Sheet 1

United States Patent Office 3,395,672
Patented Aug. 6, 1968

3,395,672
AMPHIBIOUS MOTOR VEHICLE
Walter Ruf, Landhaus am See, Thurgau,
Bottighofen, Switzerland
Continuation-in-part of application Ser. No. 492,532,
Oct. 4, 1965. This application Apr. 20, 1967, Ser.
No. 632,366
Claims priority, application Germany, Oct. 2, 1964,
R 38,907
10 Claims. (Cl. 115—1)

ABSTRACT OF THE DISCLOSURE

A floatable six-wheel motor vehicle in which the front wheels and the rear wheels may be steered in opposite directions, while the middle wheels are nonsteerable.

Disclosure

Figure 1:
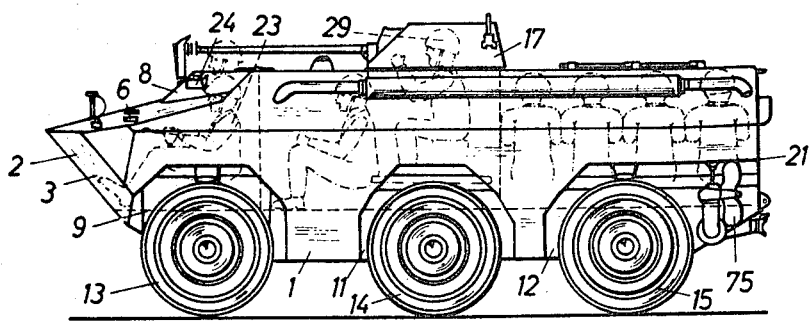

This application is a continuation-in-part of my copending U.S. patent application Ser. No. 492,532, filed Oct. 4, 1965, now abandoned.

The present invention relates to an amphibious motor vehicle consisting of a water-tight body, particularly a tank hull and three pairs of wheels arranged thereon, namely a front pair, a middle pair and a rear pair.

Six-wheel vehicles have considerable advantages over four-wheel vehicles, particularly for military purposes, which advantages include greater load-carrying capacity, ability to move over trenches, better terrain holding, greater insensitivity to injury of a tire (for instance by bombardment), more favorable distribution of the total weight (distribution of axial pressure), better absorption of gun recoil upon shooting transverse to the vehicle, and many more. However, they have the disadvantage of poorer maneuverability than four-wheel vehicles, and require larger turning circles when traveling around curves.

It is therefore an object of the present invention to improve the maneuverability of a six-wheel vehicle upon overland travel and travel in water. For this purpose, the nonsteerable pair of wheels is arranged approximately in the center of the vehicle, while the two steerable pairs of wheels are arranged at the front and rear of the vehicle, and are adapted to turn in opposite directions to each other.

The angle of turn of the wheels is generally established structurally by the greatest possible angle of deflection of the wheel drive shafts and by the size of the space available for the wheel boxes. In the six-wheel vehicle of the present invention, substantially smaller curve radii are obtained for the same angle of turn as compared with the case in which the front pair of wheels and the middle pair of wheels are steerable, and the rear pair of wheels is rigid. In this way, the maneuverability of the vehicle is substantially improved. Since the middle wheels in the vehicle of the present invention do not turn, substantially less space is required for their wheel boxes. This represents a considerable advantage since it is highly desirable to have as much available space as possible in the middle of the vehicle in order to receive various military devices, such as a gun-turret, or the like.

When the wheel base between the front steerable pair of wheels and the middle nonsteerable pair of wheels is greater than the wheel base between the latter and the rear pair of wheels, the steering of the vehicle, when traveling on roads, is more favorable than when equal wheel bases are employed. The radius of turn of the front wheel, which is on the outside, is greater than the radius of turn of the corresponding rear wheel. Since the swinging movement of the front part of the vehicle can be better checked by the driver when traveling around curves, better dependability when traveling around curves thus results.

Furthermore, the turn of the front wheel or rear wheel, which lies on the outer side of a curve, should be greater than the turn of the associated wheel lying on the inside of a curve. The turn angles are generally so determined in this connection that the axes of all wheels intersect at a common point. Preferably, the central pair of wheels are, furthermore, each suspended on crank arms. In this way, greater width of the vehicle in its center is obtained as compared with suspension of the middle wheels by means of wishbones.

The propeller drive and/or the propeller control are derived from the drive and the steering of the rear pair of wheels when the vehicle is used as a floating vehicle. The swinging of the wheels by steering same is advantageously retained during floating since the wheels act as auxiliary rudders. Since the front wheels and the rear wheels swing in opposite directions in the vehicle of the present invention, upon floating the bow of the vehicle is pressed against the inside of the curve and the stern of the vehicle against the outside of the curve, resulting in a smaller curve radii. The propellers must be swung in the same manner as the rear wheels, and it is possible, according to the present invention, to couple the swinging of the propellers with the swinging of the rear wheels. Furthermore, the drive of the propellers can be derived from the rear wheels, particularly if there is provided in the transmission system a gear at which the speed of floating of the vehicle corresponds to the speed of travel upon land. This has the advantage of permitting the vehicle to operate in shallow water when the wheels are at times in engagement with the bottom and at times not in engagement therewith.

Figure 2:
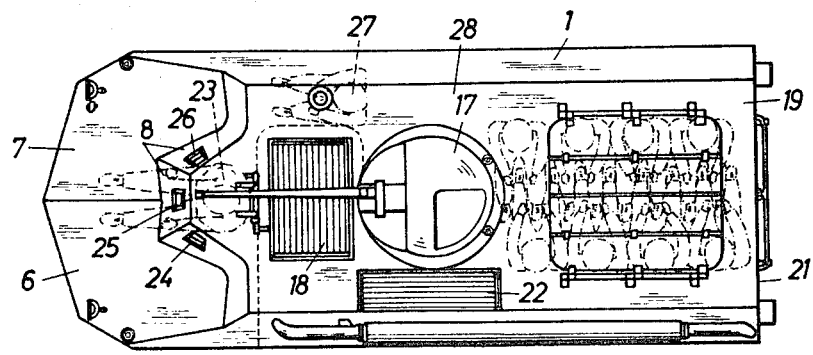
Figure 3:
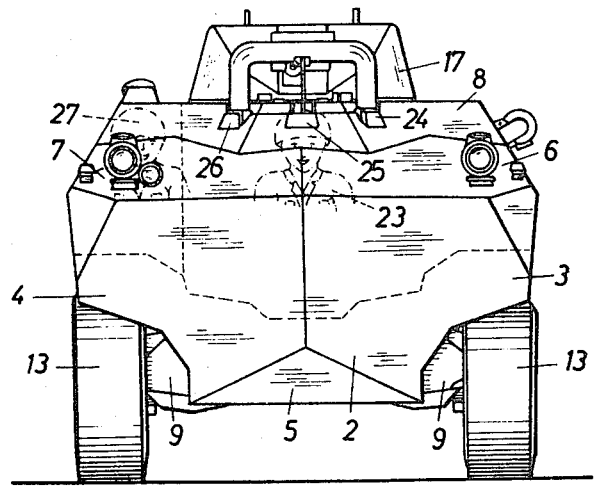
Figure 4:
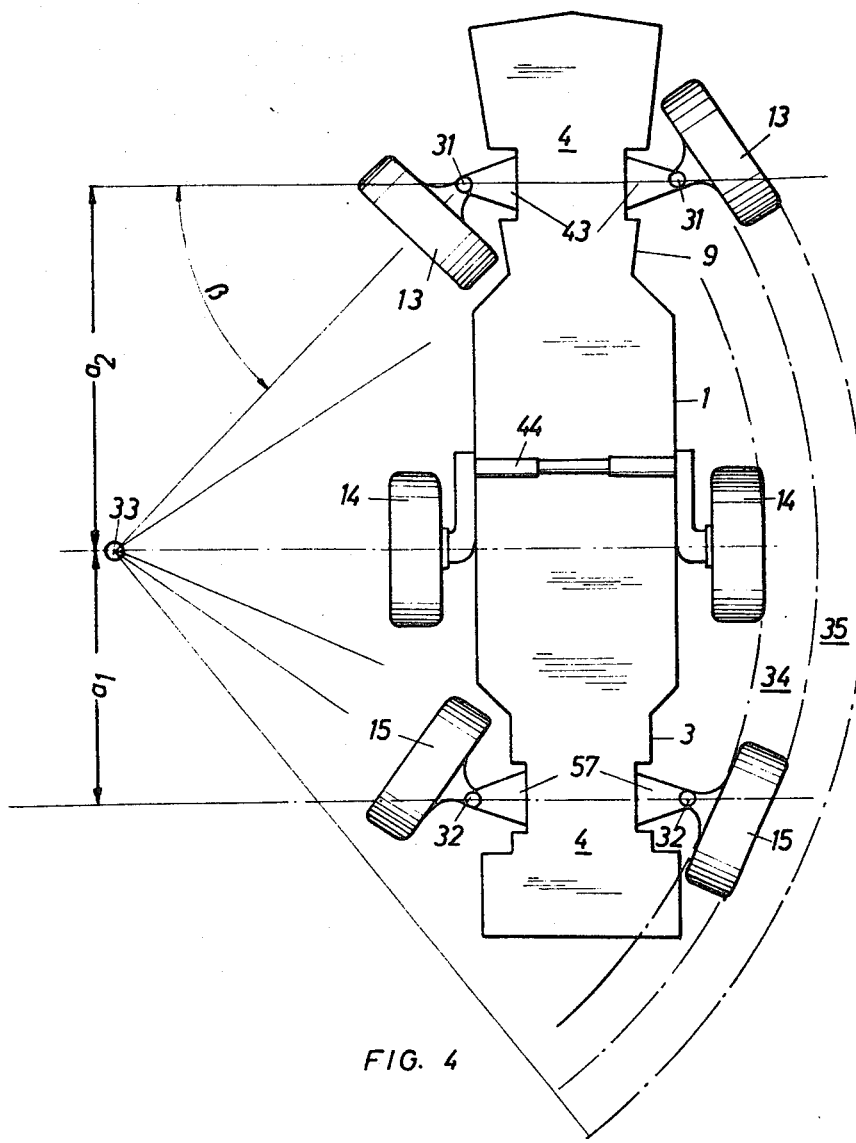
Figure 5:
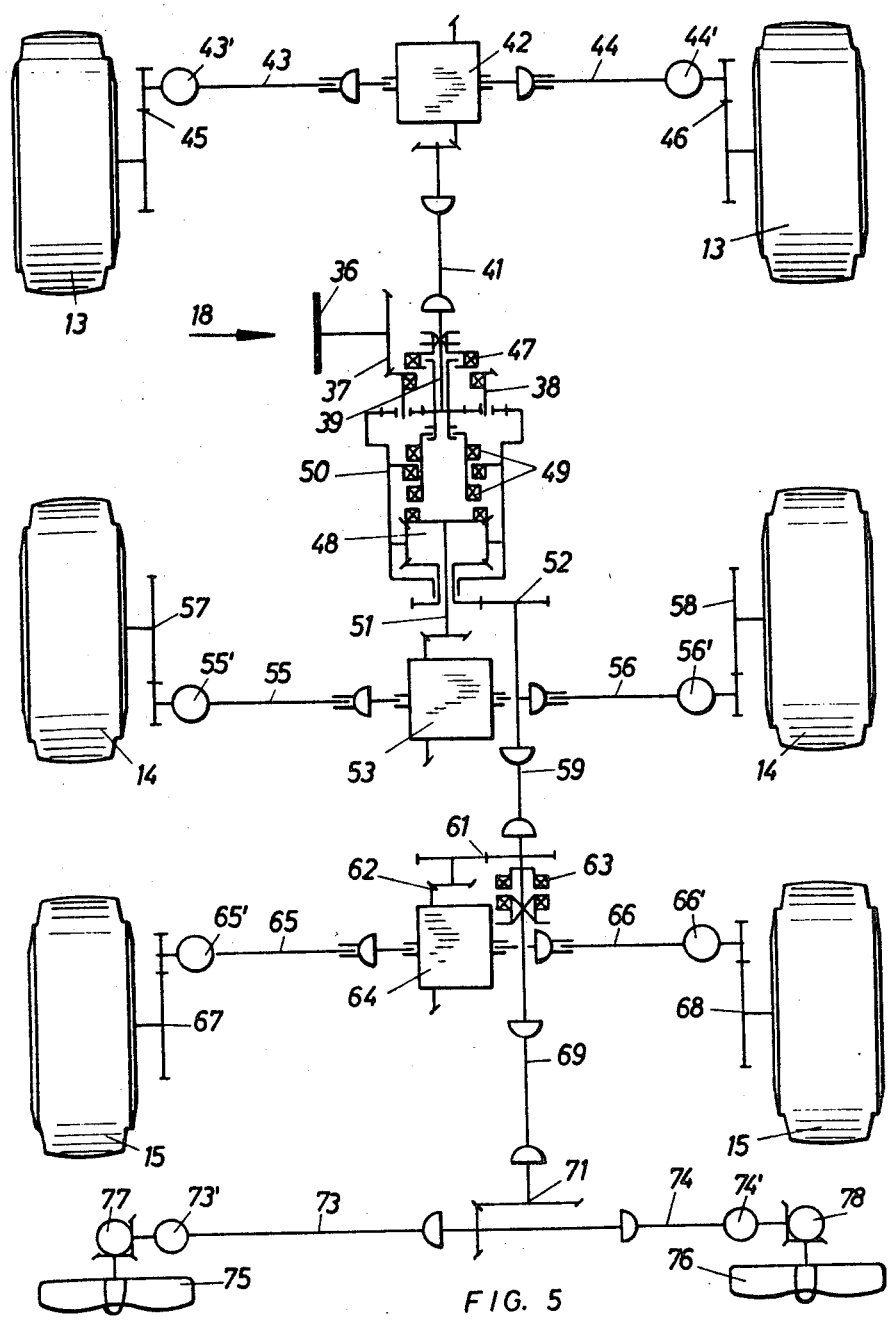
Figure 6:
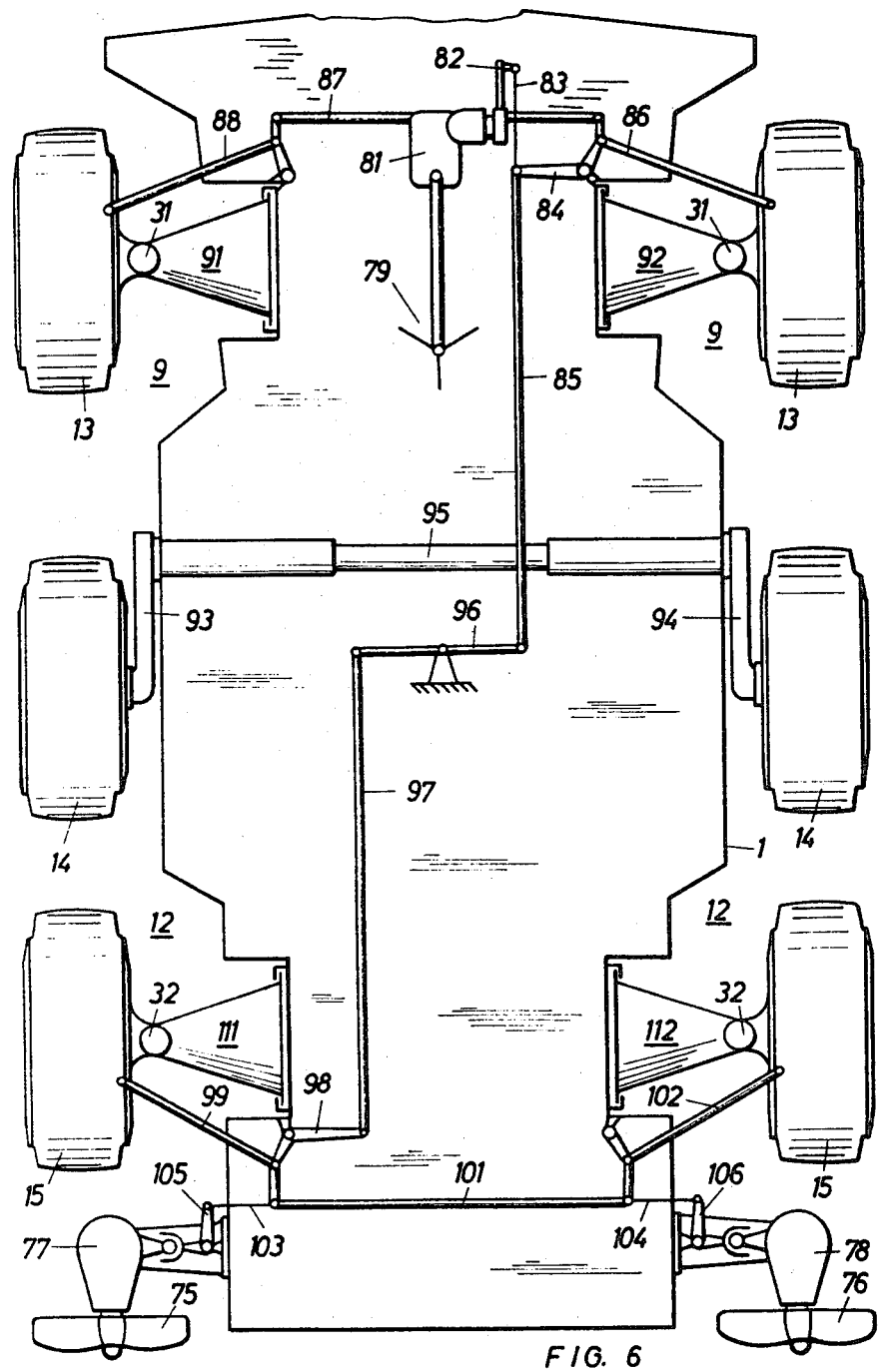
Figure 7:
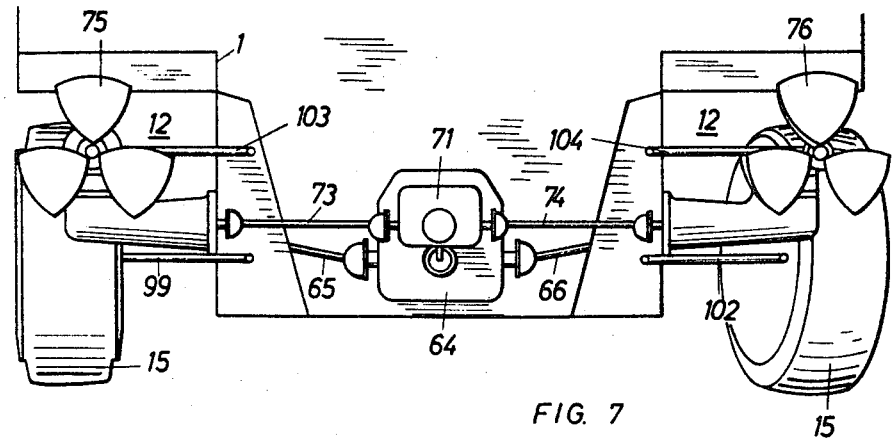
Figure 8:
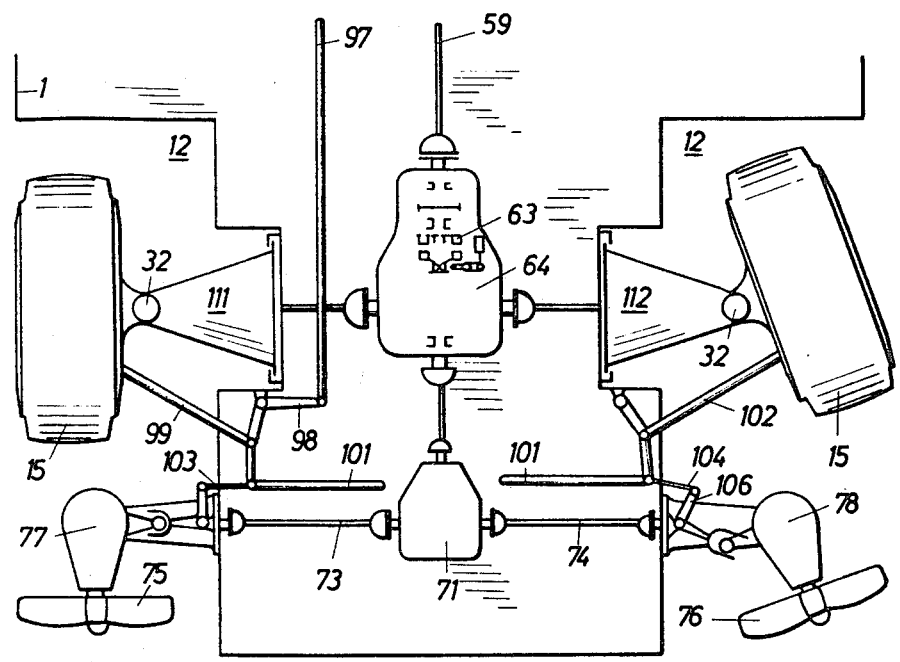

A six-wheel vehicle is shown in the accompanying drawings, in which:

FIG. 1 is a side view of the vehicle;
FIG. 2 is a top view of the vehicle;
FIG. 3 is a front view of the vehicle;
FIG. 4 shows schematically the steering of the wheels;
FIG. 5 is a schematic view of the drive members for the pairs of wheels and the propellers;
FIG. 6 is a schematic showing of the suspension of the pairs of wheels and of the steering members for the front and rear pairs of wheels and for the swinging of the ship's propellers;
FIG. 7 is a rear view of the vehicle; and
FIG. 8 depicts the coupling of the swinging-in of the rear wheels with the swinging of the propellers, the left hand part of the figure representing travel in a straight line and the right hand part of the figure, travel along a curve.

The vehicle has an armoured body 1 which is enclosed on all sides, the water displacement of the vehicle being greater than the total weight thereof. The bow 2 of the tank hull 1 is of prismatic shape and includes two front plates 3 and 4, the normals of which extend oblique to the horizontal and oblique to the longitudinal axis of the vehicle. These front plates are connected with each other with a butt edge which extends at an angle of about 45° to the vertical. The bow 2 also includes a bottom plate 5 and two top plates 6 and 7 extending slightly inclined to the horizontal, and a protrusion 8 which is placed on the top plates 6 and 7. The tank hull 1 also has lateral indentations 9, 11 and 12 which receive the front wheels 13, the middle wheels 14 and the rear wheels 15.

In the middle of the vehicle, preferably over the middle wheels 14, there is placed, on the tank hull 1, a gun cupola 17. Between the front wheels 13 and the central wheels 14 there is arranged a drive 18 including a motor, a clutch and a transmission, the drive being arranged symmetrical to the central longitudinal axis of the vehicle so that a uniform distribution of weight results. The crankshaft (not shown) of the motor and the axis of rotation of the clutch lie transverse to the direction of travel. By the transverse arrangement of the motor between the wheels 13 and 14, it is also possible to arrange a motor at a rather low height, which has a favorable effect on the center of gravity of the vehicle and thus on its floating properties. Behind the gun cupola 17 there is a space for soldiers 19 which is closed off towards the rear by a large tailgate 21. Instead of the soldiers, materials of all types can, of course, also be transported therein.

Above the central wheels 14, a cooling system 22 for the motor 18 is arranged in a side wall which is developed as a double wall.

For the driver 23 of the vehicle, a seat is provided in the central longitudinal axis of the vehicle between the front indentations 9, in front of the drive 18. Since the legs of the driver extend far below the level of the upper edges of the indentations, a very low vehicle silhouette is thereby obtained. For the driver 23 there are provided three periscopes 24, 25 and 26, the viewing lenses of which lie in the protrusion 8. The optical axes of the outer periscopes 24 and 26 form with the central longitudinal axis of the vehicle, and thus with the optical axis of the traveling periscope 25, an angle of at least 30°, preferably 45°, or even 60°.

To the side of the drive 18 there is provided a seat for the commander 27 of the vehicle. By this arrangement an escape path 28 is provided which leads past the drive 18 to the soldiers' compartment 19, thus making it possible for the commander to reach any point of the vehicle and thus give the driver 23, the gunner 29, or the soldiers the necessary commands. If necessary, the driver 23 can also pass through the connecting passage 28 into the soldiers' compartment 19, and thus possibly leave the vehicle from its rear.

From FIG. 4 there is seen the principle of steering the vehicle of the present invention. The front pair of wheels 13 is swingable in the wheel boxes formed by the indentations 9 at most by the angle of swing $\beta$. The front wheels 13, upon steering, turn around vertical axles 31 and the rear wheels around vertical axles 32. The distance $a_2$ between the axles 31 and the axles of rotation of the middle wheels 14 is, in this connection, greater than the distance $a_1$ between the latter and the axles of rotation 32. The distance $a_1$ thus can correspond approximately to the distance of the axles of rotation 32 from each other. The swinging movement of all wheels is so controlled that their axles point to a common centerpoint 33. From this arrangement the curve track 34 of the wheel of the rear pair of wheels 15, which lies on the outside upon traveling over the curve, is further towards the inside than the curved track 35 of the wheel of the front pair of wheels 13, which lies on the outside. In this manner the outside wheel of the rear pair of wheels 15 is prevented from traveling over ground, the freedom of load-carrying capacity of which has not been previously checked by the outer wheel of the pair of wheels 13. If, therefore, for instance, the driver notices that when traveling around a curve the outer wheel of the front pair of wheels 13 has come too far off the street, or spins for any other reason, he can then reverse the drive, since the remaining pairs of wheels 14 and 15 are still positively engaging the ground.

As shown in FIG. 5, the output of the drive 18 is transmitted, via a transmission output 36, to a bevel gear 37 of a first torque distributor 38 of known construction, the torque distributor 38 serving simultaneously as a longitudinal equalizer, and containing planet gears, in a known manner. The arrangement is such that a driven shaft 39 gives off a third of the motor power via a universal shaft 41 to a self-locking differential 42 for the front pair of wheels 13. Universal shafts 43 and 44 are provided which are sealed off at 43' and 44'; are passed through the side walls of the tank hull 1; and are connected with a self-locking differential 42 and with separate pairs of drive gears 45 and 46 for the axles of the wheels. Between the driven shaft 39 and the torque distributor 38, there is another lock 47 by means of which the longitudinal equalizer can be blocked.

The other two thirds of the motor power is fed from the hollow gear of the set of planet gears to a second torque distributor 48 containing a longitudinal equalizer 49 which can be locked by means of a lock. The torque distributors 38 and 48 are seated in a common housing 50 between the front wheels 13 and the middle wheels 14. The second torque distributor 48 has two driven shafts 51 and 52, the driven shaft 51 being connected with a self-locking differential 53 for the middle pair of wheels 14, for which purpose universal shafts 55 and 56 are provided. These shafts are passed through the tank hull 1, are sealed off at 55' and 56', and drive pairs of drive gears 57 and 58 for the axles of the middle wheels 14. The driven shaft 52 is connected for drive via a universal shaft 59 and a pair of gears 61 with a bevel gear 62 and with a clutch 63. The bevel gear 62 drives a self-locking differential 64 for the rear pair of wheels 15 for which purpose universal shafts 65 and 66 are provided which are passed through the tank hull 1, are sealed off at 65' and 66', and which drive pairs of drive gears 67 and 68 for the rear wheels 15. With the driven shaft of the clutch 63 there is connected, via a universal shaft 69, an angle drive 71 which drives two universal shafts 73 and 74, the latter being passed through the tank hull 1 and sealed off at 73' and 74'. Laterally alongside the tank hull 1 at the rear end thereof, there are swingably arranged, just behind the rear wheels 15, two water propellers 75 and 76 which are swingable about vertical pins 77 and 78, the latter being driven by the universal shafts 73 and 74 when the clutch 63 is engaged.

The steering of the front pair of wheels 13 and the rear pair of wheels 15, as well as the swinging of the propellers 75 and 76 are shown in FIG. 6. The driver 25 steers the vehicle by means of a steering wheel 79 which, via a steering gear 81, swings a lever 82 which is connected by means of a rod 83 with a steering control arm 84 for the front pair of wheels 13, and with a front drag rod 85. The steering control arm 84, via a right track rod 86, swings the right wheel of the front pair of wheels 13 via a central track rod 87; and, via a left track rod 88, swings the left hand wheel of the front pair of wheels 13.

The wheels of the front pair of wheels 13 are rotatably mounted on vertical axes 31 via control arms 91 and 92 fixed to the tank hull 1. Upon rotation of the steering wheel 79, wheels 13 are swung about the axles 31 in the indentations 9 of the tank hull 1.

The axles of the middle pair of wheels 14 are fastened to crank arms 93 and 94 which act on a torsion bar 95 in a known manner.

The front drag rod 85 is connected, via a reverse rod 96, with a rear drag rod 97 which acts on a steering control arm 98. The control arm 98, via a left hand track rod 99, swings the left hand wheel of the rear pair of wheels 15 and, via a central track rod 101 and a right hand track rod 102, swings the right hand wheel of the rear pair of wheels 15. With the middle track rod 101 there are connected drag rods 103 and 104 which, via bell-crank levers 105 and 106, swing the propellers 75 and 76 around their vertical axes of rotation 77 and 78 in response to the inward swinging movement of the rear wheels 15. The rear wheels 15 are rotatably mounted about their vertical axes of rotation 32 by means of control arms 111 and 112 to the tank hull 1.

Upon the turning of the steering wheel 79, via the rear drag rod 97, the wheels of the rear pair of wheels 15 are swung around their vertical axes of rotation 32, and the propellers 75 and 76 are swung about their axes of rotation 77 and 78 in opposite direction to the turn of the front wheels. When traveling in water, the wheels of the front pair of wheels 13 and the wheels of the rear pair of wheels 15 accordingly act as auxiliary rudders. In this connection, the gear shifting of the vehicle can be so designed that a step-up ratio for fording streams, and therefore for a transition stage between floating and traveling in shallow water, is provided. The speed of rotation of the propellers is then adapted to the drive speed by the gears 13, 14 and 15 so that, in this gear, equal speeds of the vehicle are obtained regardless of whether it is driven floating by the propellers 75 and 76, or driven by the wheels 13, 14 and 15, or by both. Since the wheels 13, 14 and 15 do not spin when traveling in the slime in shallow water, and the steering of the vehicle is substantially facilitated by the opposite turning of the front wheels 13 and the rear wheels 15, there is obtained a considerably improved maneuverability of the vehicle.

All drive elements and the entire steering system are arranged to be protected against damage and action of water within the tank hull 1.

Of course, variations of the specific construction and arrangement of this type device herein disclosed can be made by those skilled in the art without departing from the invention as defined in the appended claims.

What is claimed is:

1. An amphibious motor vehicle comprising a tank hull; a set of front wheels; a set of middle wheels; a set of rear wheels, said wheels being arranged on both sides of and outside said hull; a driving engine including a clutch and a gear member arranged in said hull between said front wheels and said middle wheels; first, second, and third self-locking differentials arranged in said hull between said front wheels, said middle wheels and said rear wheels respectively; a plurality of shafts extending in a water-tight manner, through the walls of said hull and adapted to transmit the output driving power from said differentials to said front wheels, said middle wheels and said rear wheels respectively; an angle drive arranged at the rear end of said hull; two propellers arranged on both sides of the rear end of said hull outside of same; and two shafts extending in a water-tight manner through said hull on opposite sides thereof and connecting said angle drive with said propellers.

2. An amphibious motor vehicle comprising a water-tight body, a set of front wheels, a set of middle wheels, a set of rear wheels, axles for said wheels, the axles of said front wheels and said rear wheels being swingably connected for steering purposes around vertical axes of rotation with said body, the axles of the middle wheels being non-swingably connected with said body, means for steering the vehicle to cause the swinging of the front wheels and of the rear wheels to take place in opposite directions, a driving engine including a clutch and a gear member, and transmission means to transmit output driving power of said gear member to the axles of at least two of said sets of wheels, the distance between the axle of a rear wheel and the axle of a middle wheel arranged on the same side of the vehicle being less than the distance between said axle of the middle wheel and the axle of the front wheel arranged on the same side of the vehicle.

3. An amphibious motor vehicle comprising a water-tight body, a set of front wheels, a set of middle wheels, a set of rear wheels, axles for said wheels, the axles of said front wheels and said rear wheels being swingably connected for steering purposes around vertical axes of rotation with said body, the axles of the middle wheels being non-swingably connected with said body, means for steering the vehicle to cause the swinging of the front wheels and of the rear wheels to take place in opposite directions, a driving engine including a clutch and a gear member, and transmission means to transmit output driving power of said gear member to the axles of at least two of said sets of wheels, the distance between the vertical axes of rotation around which the rear wheels are swingable on both sides of the vehicle being smaller than the distance between the axles of the rear wheels and of the middle wheels.

4. An amphibious motor vehicle according to claim 3, in which the distance between the vertical axes of rotation around which the front wheels and the rear wheels are swingable on both sides of the vehicle is substantially the same as the distance between the axles of the middle wheels and the axles of the rear wheels.

5. An amphibious motor vehicle comprising a water-tight body, a set of front wheels, a set of middle wheels, a set of rear wheels, axles for said wheels, the axles of said front wheels and said rear wheels being swingably connected for steering purposes around vertical axes of rotation with said body, the axles of the middle wheels being non-swingably connected with said body, means for steering the vehicle to cause the swinging of the front wheels and of the rear wheels to take place in opposite directions, a driving engine including a clutch and a gear member, transmission means to transmit output driving power of said gear member to the axles of at least two of said sets of wheels, and a plurality of crank arms, each of which connects an axle of the middle wheels with said body.

6. An amphibious motor vehicle comprising a water-tight body, a set of front wheels, a set of middle wheels, a set of rear wheels, axles for said wheels, the axles of said front wheels and said rear wheels being swingably connected for steering purposes around vertical axes of rotation with said body, the axles of the middle wheels being non-swingably connected with said body, means for steering the vehicle to cause the swinging of the front wheels and of the rear wheels to take place in opposite directions, a driving engine including a clutch and a gear member, and transmission means to transmit output driving power of said gear member to the axles of at least two of said sets of wheels, said transmission means comprising two torque distributors and first, second, and third power transmission members, the output driving power being transmitted from the gear member to the first torque distributor by the first power transmission means from which approximately one-third of the output driving power is transmitted by the second power transmission member to one of the pairs of wheels, and approximately two-thirds of the output driving power is transmitted to the second orque distributor from which it is distributed to at least one set of said other sets of wheels by the third power transmission means.

7. An amphibious motor vehicle according to claim 6, further comprising a common housing for the two torque distributors, said housing being arranged between the set of front wheels and the set of middle wheels; and a first universal shaft and a first self-locking differential via which the first torque distributor drives the axles of the front wheels.

8. An amphibious motor vehicle according to claim 7, further comprising a second and a third universal shaft; a clutch; a second and third self-locking differential; and at least one propeller; the second torque distributor driving the middle wheels via the second self-locking differential, driving the rear wheels via the second universal shaft and the third self-locking differential, and driving the propellers via the second universal shaft, the clutch and the third universal shaft.

9. An amphibious motor vehicle comprising a water-tight body, a set of front wheels, a set of middle wheels and a set of rear wheels, a driving engine including a clutch and a gear member, said driving engine being arranged between said front wheels and said rear wheels with the crankshaft of the engine and the axis of rotation of the clutch extending transverse to the direction of vehicle travel, means to transmit output driving power of said gear member to said wheels, at least one propeller in the vicinity of the rear wheels, said rear wheels and said propeller each being swingable about vertical axes, means to connect the rear wheels and the propeller to cause the propeller to follow the swinging movement of the rear wheels in the same direction, and control means for effecting the swinging of the rear wheels and of the propeller.

10. A water-tight vehicle comprising a hull of steel which on its front side is formed into a prism-shaped bow including two front plates, the perpendiculars to the plane of said plates being inclined to the horizontal and inclined to the longitudinal axis of the vehicle, said plates being connected with each other by a joint which extends at an angle of approximately 45° to the vertical; a bottom plate; two top plates extending at a slight inclination to the horizontal; a protrusion disposed on the top plates and having at least three observation openings therein, said openings being spaced angularly apart from each other in the horizontal plane; and periscopes for the driver of the vehicle which are arranged with their viewing lenses each in one of said openings.

References Cited

UNITED STATES PATENTS

| 3,183,991 | 5/1965 | Gamaunt | 180—24 |
| 3,302,739 | 2/1967 | Beck et al. | 180—24 |
| 3,323,610 | 6/1967 | Kress et al. | 280—91 |
| 3,161,172 | 12/1964 | Kässbohrer | 115—1 |

FOREIGN PATENTS 495,022  11/1938  Great Britain.

OTHER REFERENCES

"New Army Vehicles," Army Ordnance, May-June 1944, p. 535.

ANDREW H. FARRELL, *Primary Examiner.*